Dec. 21, 1926.
A. HARRIS
1,611,745
MOTOR VEHICLE ATTACHMENT
Filed Oct. 26, 1925
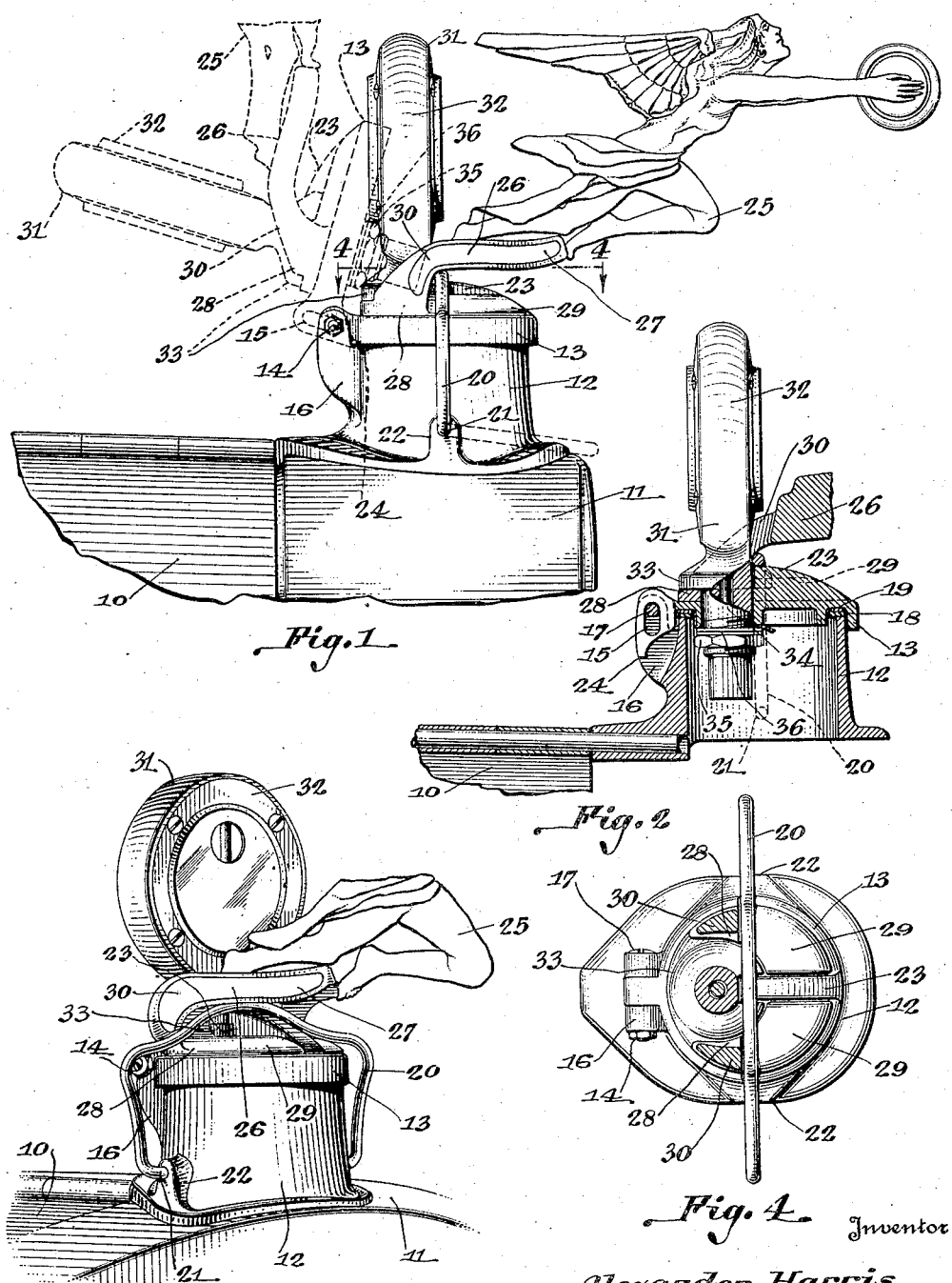
Inventor
Alexander Harris
By Milton Silhto
Attorney Patented Dec. 21, 1926.

1,611,745

UNITED STATES PATENT OFFICE.

ALEXANDER HARRIS, OF NEWARK, NEW JERSEY, ASSIGNOR TO PACKARD MOTOR CAR COMPANY, OF DETROIT, MICHIGAN, A CORPORATION OF MICHIGAN.

MOTOR-VEHICLE ATTACHMENT.

Application filed October 26, 1925. Serial No. 64,788.

This invention relates to motor vehicle attachments and particularly to the radiator and means for attaching an ornament thereto.

One of the objects of the present invention is to provide a motor vehicle radiator with a pivoted filler cap and an ornament thereon adapted to extend above and forwardly of the cap.

Another object of the invention is to provide a radiator with a filler cap having a forwardly extending ornament thereon and means whereby a bail may be employed for retaining the cap in place.

Another object of the invention is provide a radiator cap with an ornament and a motometer so arranged that the motometer may be used to retain the ornament in place.

Another object of the invention is to provide a simple combination of a radiator cap, radiator ornament and motometer for motor vehicles.

Other objects of the invention will appear from the following description taken in connection with the drawings, which form a part of this specification, and in which:

Fig. 1 is a side elevation of the forward portion of a motor vehicle embodying the invention;

Fig. 2 is a vertical section through the radiator filler tube and cap shown in Fig. 1;

Fig. 3 is a three-quarter perspective view of the parts shown in Fig. 1, and

Fig. 4 is a horizontal section substantially on the line 4—4 of Fig. 1.

Referring to the drawings, 10 represents the forward part of a motor vehicle and 11 is the radiator or radiator assembly which is mounted at or forms a part of the forward end of the vehicle. The upper part of the radiator is formed by a filler tube 12 through the opening in which the radiator is filled with water.

A cap for the tube is shown at 13 and this cap is pivoted to the tube as at 14, the cap having a slot 15 and the ears 16 of the tube 12 having a pin 17 in the slot. Thus the cap 13 is pivoted to the tube and yet it has a certain amount of freedom of movement vertically so that it may be clamped down tight on top of the filler tube 12. For insuring a tight fit, one or more washers 18 may be arranged in a groove 19 in the cap as shown in Fig. 2.

The cap is adapted to be tightly retained on the tube by means of a bail 20 which is pivoted at 21 in bosses 22 on the sides of the filler tube 12. This bail 20 is made of rather heavy wire and shaped as shown in Fig. 3 so that there will be sufficient spring to it to tightly retain the cap in place. It operates on a cam 23 formed on top of the cap and preferably in the middle of the cap, extending from about the center to the forward edge thereof. This cam is so tapered that as the bail is moved along its surface toward the center of the cap the latter will be drawn down tightly on the top of the tube 12.

In Fig. 1 the cap is shown in full lines in clamped position and in dotted lines the bail 20 has been moved away from the cap and the cap has been moved upwardly and backwardly to its open position. In this position a stop 24 limits the movement of the cap so that it cannot drop back on the hood of the vehicle.

A radiator ornament, indicated at 25, is shown as mounted upon the radiator cap. This is in the form of a statuette arranged upon a pedestal or a support 26 and extends upwardly and forwardly from the radiator cap. The support 26 is so connected to the radiator cap that it does not interfere with the operation of the bail 20 which retains the cap in place. Thus the support 26 has a portion arranged above and forwardly of the bail 20, this portion being indicated at 27, and it has a portion 28 arranged beneath the bail and adapted to rest upon the top of the cap 13. Most of the portion 28 is rearwardly of the bail 20 but in order to make a better seat for the support, it is formed with two legs 29 which extend on either side of the cam 23. The parts 27 and 28 of the support 26 are connected by separated arms 30 as shown in all four of the figures. These arms extend over the bail 20 and then turn downwardly to the portion 28 of the support where it rests on the top of the cap 13.

The support 26 may be retained in place on the cap by means extending through the support and the cap, and in the form shown, this means is a motometer 31, of usual form. This motometer has an indicator part 32, a base 33 which rests upon the portion 28 of the support 26 between the arms 30, and a shank 34 which extends through the portion 28 of the support and through the cap 13 just rearwardly of the bail 20 and cam 23. A nut 35 and washers 36 on the inside of the cap retain the motometer in place and at the same time the support 26 is clamped to the cap.

By this arrangement of parts the functions of the motometer are not interfered with by the radiator ornament, and neither is the operation of the bail 20 in locking and unlocking the cap 13 interfered with by the position of the support 26.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of a filler tube, a cap therefor, a bail pivoted to the tube and extending crosswise of the cap for retaining the latter on the tube, an ornament support on the cap and having a portion extending from the rear part of the cap forwardly over the bail, and a motometer for retaining the ornament support in place on the cap.

2. In a motor vehicle, the combination of a radiator filler tube, a cap therefor, a bail for retaining the cap in place, an ornament support having a part extending over the bail, and a motometer for retaining the ornament support on the cap.

3. A radiator filler cap comprising a pivoted member having a cam, a motometer mounted on the cap rearwardly of said cam, and an ornament support secured to the cap by said motometer and having arms extending from the part of the cap rearwardly of the cam on both sides of the motometer and upwardly and forwardly to a position for supporting an ornament in front of the motometer.

4. A radiator comprising a filler tube, a cap therefor, a bail pivoted to the tube and adapted to extend across the cap to retain the latter in place on the tube, said cap having a cam on its upper surface upon which the bail operates, an ornament support having a portion arranged above the cam and having arms extending rearwardly over the bail and downwardly to the cap, and means for securing the arms to the cap.

5. A radiator comprising a filler tube, a cap therefor, a bail pivoted to the tube and adapted to extend across the cap to retain the latter in place on the tube, said cap having a cam on its upper surface upon which the bail operates, an ornament support having a portion arranged above the cam and having arms extending rearwardly over the bail and downwardly to the cap, and a motometer for securing the arms to the cap.

6. A radiator comprising a filler tube, a cap therefor having a cam surface, a bail pivoted to the tube and co-operating with the cam surface to retain the cap in place, and an ornament secured to the cap rearwardly of the bail and having arms extending forwardly and upwardly over the bail.

7. A radiator comprising a filler tube, a cap therefor having a cam surface, a bail pivoted to the tube and co-operating with the cam surface to retain the cap in place, an ornament secured to the cap rearwardly of the bail and having a motometer for retaining the ornament in place on the cap.

8. In a motor vehicle, the combination of a radiator having a filler tube, a cap arranged to cover the tube, a bail pivoted to the tube beolw the cap and arranged to retain the cap in place on the tube, and an ornament support having a part on the cap beneath the bail and a part above the bail together with arms connecting the upper and lower parts.

9. In motor vehicle attachments, the combination of a radiator filler cap having a cam surface thereon, a detachable ornament support mounted on the cap and having a portion arranged above the cam, a portion extending therefrom to the cap, legs extending forwardly on either side of the cam, and means for detachably securing the ornament support to the cap.

10. In a motor vehicle attachment, the combination of a radiator cap having a substantially flat surface and a cam raised above the flat surface, a detachable ornament support having a portion seated against the flat surface of the cap and on both sides of said cam and having a portion extending upwardly and forwardly therefrom, and a motometer for detachably securing the support to the cap rearwardly of the cam.

In testimony whereof I affix my signature.

ALEXANDER HARRIS.